US 8,370,833 B2

(12) United States Patent
Bolles et al.

(10) Patent No.: US 8,370,833 B2
(45) Date of Patent: Feb. 5, 2013

(54) METHOD AND SYSTEM FOR IMPLEMENTING A VIRTUAL STORAGE POOL IN A VIRTUAL ENVIRONMENT

(75) Inventors: Benton R. Bolles, Louisville, CO (US); Adam John Carter, Broomfield, CO (US); Philip J. Duclos, Longmont, CO (US); Brent D. Helgeson, Broomfield, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1196 days.

(21) Appl. No.: 12/101,051

(22) Filed: Apr. 10, 2008

(65) Prior Publication Data
US 2009/0210875 A1 Aug. 20, 2009

Related U.S. Application Data

(60) Provisional application No. 61/030,180, filed on Feb. 20, 2008.

(51) Int. Cl.
*G06F 9/455* (2006.01)
*G06F 9/46* (2006.01)
*G06F 12/00* (2006.01)

(52) U.S. Cl. .............................. 718/1; 718/105; 711/147
(58) Field of Classification Search .................. None
See application file for complete search history.

(56) References Cited

U.S. PATENT DOCUMENTS

| 5,964,886 | A * | 10/1999 | Slaughter et al. ............. 714/4.1 |
| 7,213,246 | B1 * | 5/2007 | van Rietschote et al. ......... 718/1 |
| 7,363,457 | B1 * | 4/2008 | Dekoning et al. ............ 711/170 |
| 8,006,049 | B2 * | 8/2011 | Friauf et al. .................. 711/159 |
| 2002/0133681 | A1 | 9/2002 | McBrearty |
| 2004/0215749 | A1 | 10/2004 | Tsao |
| 2005/0021562 | A1 | 1/2005 | Idei |
| 2006/0069761 | A1 * | 3/2006 | Singh et al. ................... 709/222 |
| 2006/0075199 | A1 | 4/2006 | Kallahalla |
| 2006/0248527 | A1 * | 11/2006 | Jaeckel et al. .................... 718/1 |
| 2007/0028068 | A1 * | 2/2007 | Golding et al. ............... 711/170 |
| 2007/0204265 | A1 * | 8/2007 | Oshins ............................. 718/1 |
| 2008/0005297 | A1 | 1/2008 | Kjos |
| 2008/0104347 | A1 * | 5/2008 | Iwamura et al. .............. 711/162 |
| 2008/0104443 | A1 * | 5/2008 | Akutsu et al. ..................... 714/6 |
| 2008/0126834 | A1 * | 5/2008 | Sankaran et al. ................ 714/4 |
| 2009/0055593 | A1 * | 2/2009 | Satoyama et al. ............ 711/134 |
| 2009/0300605 | A1 * | 12/2009 | Edwards et al. .................. 718/1 |
| 2010/0017802 | A1 | 1/2010 | Lojewski |

FOREIGN PATENT DOCUMENTS

DE 102006032832 A1 7/2006

OTHER PUBLICATIONS

Written Opinion and International Search Report for International Application No. PCT/US2009/034603, Oct. 1, 2009, 9 pages.
Translation of German Patent Office Office Action dated Jun. 28, 2011 for German Appl. No. 112009000411.3 (5 pages).
GB Office Action, Application No. GB1015698.2, Feb. 29, 2012, 4 pps.
GB Office Action, Application No. GB1015698.2, Oct. 10, 2012, 5 pps.

* cited by examiner

*Primary Examiner* — Meng An
*Assistant Examiner* — Tammy Lee (57) ABSTRACT

A system and method for implementing distributed data storage. In particular, the system includes a plurality of virtualization servers, each of which is associated with available data resources. Each virtualization server supports one or more application virtual machines through a virtualization layer. In addition, a plurality of storage virtual machines is included in the system. Each storage virtual machine is associated with a corresponding and participating virtualization server. A virtual storage pool is included in the system, wherein each storage virtual machine allows the export and aggregation of available data resources within a corresponding virtualization server into the virtual storage pool.

20 Claims, 6 Drawing Sheets

METHOD AND SYSTEM FOR IMPLEMENTING A VIRTUAL STORAGE POOL IN A VIRTUAL ENVIRONMENT

CROSS REFERENCE TO RELATED APPLICATIONS

The present application claims priority to and the benefit of Provisional Application No. 61/030,180 to Bolles et al., entitled "Method and System for Implementing a Virtual Storage Pool in a Virtual Environment," filed on Feb. 20, 2008, which is herein incorporated by reference in its entirety.

BACKGROUND OF THE INVENTION

1. Field of the Invention

The present invention is generally directed to data storage, and more particularly to implementing a virtual storage pool.

2. The Relevant Technology

Virtualization technology abstracts the server underlying modern computer systems and isolates the virtual execution environment from server limitations and behaviors. As such, applications running in such virtualized environments are essentially portable and may be migrated from one virtualization environment to another with little effect on the execution of the application. One exception to this flexibility is the application's dependency on storage. The present practice of virtualization technology abstracts many aspects of the underlying server storage; however, two aspects, that of locality and capacity, are poorly abstracted or not at all.

In the first case, locality of storage in virtualized environments describes the situation where the storage available in the virtualized environment is limited to the storage available in the underlying server, unless some other access mechanism is provided, such as network-based storage. Network-based storage alleviates the locality problem in the virtualized environment and also satisfies the requirement of shared storage which is essential for the migration of applications from one virtualized environment to another virtualized environment. However, network-based storage is an additional component which is outside and independent of the virtualized environment or its underlying server.

In the second case, capacity of storage in virtualized environments is also a limiting factor in the virtualized environment. Capacity of storage is directly related to the storage available in the underlying server, unless some other access mechanism is provided, such as network-based storage. Again, network-based storage alleviates the capacity problem in the virtualized environment. However, network based storage is an additional component which is outside and independent of the virtualized environment or its underlying server.

Thus, locality and capacity of storage are limiting factors in the virtualized environment which cannot be alleviated or affected without the addition of other external storage mechanisms.

SUMMARY

A system and method for implementing distributed data storage. In particular, the system includes a plurality of virtualization servers, each of which is associated with available data resources. Each virtualization server supports one or more application virtual machines through a corresponding virtualization layer. In addition, a plurality of storage virtual machines is included in the system. Each storage virtual machine is associated with a corresponding and participating virtualization server. A virtual storage pool is included in the system. In particular, each storage virtual machine provides for the export and aggregation of available data resources within a corresponding virtualization server into the virtual storage pool.

BRIEF DESCRIPTION OF THE DRAWINGS

Exemplary embodiments are illustrated in referenced figures of the drawings which illustrate what is regarded as the preferred embodiments presently contemplated. It is intended that the embodiments and figures disclosed herein are to be considered illustrative rather than limiting.

DETAILED DESCRIPTION OF THE PREFERRED EMBODIMENTS

Reference will now be made in detail to the preferred embodiments of the present invention, a method and system for implementing shared storage through a virtual storage pool for a network of computing resources in a virtual environment. While the invention will be described in conjunction with the preferred embodiments, it will be understood that they are not intended to limit the invention to these embodiments. On the contrary, the invention is intended to cover alternatives, modifications and equivalents which may be included within the spirit and scope of the invention as defined by the appended claims.

The present invention addresses both the locality and capacity issues of virtualized environments by providing a virtual storage pool which is comprised of the resources available within the virtualization environment. The virtual storage pool provides shared storage, thereby enabling those aspects of virtualization technology which require shared storage. Because it is comprised of resources within the virtualization environment it provides corresponding capacity increases with the addition of virtualization servers. Other means of shared storage, such as external network-based storage do not provide this inherent scalability. Being comprised of a multiplicity of virtualization servers also provides the virtual storage pool with data redundancy and high availability capabilities.

Accordingly, embodiments of the present invention are capable of creating a virtual storage pool for implementing shared storage within a virtual environment that enables key server virtualization capabilities. In addition, other embodiments of the present invention provide the above capabilities and also provides for the ability for a node to fail without loss of access to shared storage. Still other embodiments of the present invention provide the above capabilities and also provide for the migration of virtual machines to an alternate node supporting the virtual network of computing resources. Furthermore, other embodiments of the present invention provide the above capabilities and further provide scalability of the virtual storage pool as a function of the addition of computing resources supporting the virtual network of computing resources, without requiring the addition of external resources such as dedicated network based storage devices.

Notation and Nomenclature

Embodiments of the present invention can be implemented on software running on a computer system. The computer system can be a personal computer, notebook computer, server computer, mainframe, networked computer, handheld computer, personal digital assistant, workstation, and the like. This software program is operable for providing targeted data delivery. In one embodiment, the computer system includes a processor coupled to a bus and memory storage coupled to the bus. The memory storage can be volatile or non-volatile and can include removable storage media. The computer can also include a display, provision for data input and output, etc.

Some portion of the detailed descriptions that follow are presented in terms of procedures, steps, logic block, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc. is here, and generally, conceived to be a self-consistent sequence of operations or instructions leading to a desired result. The operations are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "providing," "enabling," "transferring," "receiving," or the like refer to the actions and processes of a computer system, or similar electronic computing device, including an embedded system, that manipulates and transfers data represented as physical (electronic) quantities within the computer system's registers and memories into other data similarly represented as physical quantities within the computer system memories or registers or other such information storage, transmission or display devices.

Distributed Network of Data Storage

Figure 1:
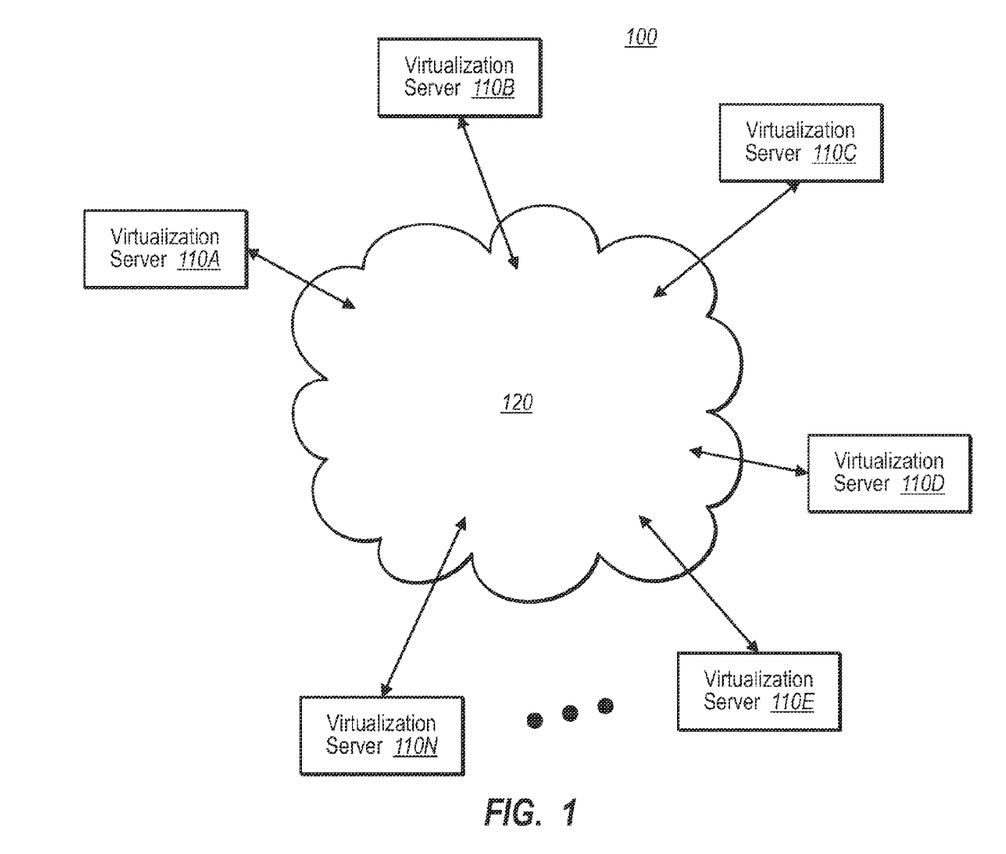
FIG. 1 is a diagram of a network of computing resources supporting distributed network storage, in accordance with one embodiment of the present invention.

FIG. 1 is a diagram illustrating a network 100 of computing systems, in accordance with one embodiment of the present invention. In particular, a plurality of virtualization servers 110A-N are coupled to a communication network 120. The communication network 120 facilitates communication between the virtualization servers 110A-N, in part to implement a distributed network of data storage, in one embodiment.

Each of the virtualization serves 110-A-N is capable if creating a virtual environment that provides for the separation of the underlying hardware (e.g., central processing unit (CPU), memory, data resources, etc.) from the applications requesting those hardware resources. In particular, each virtualization server is associated with one or more virtual computing resources, hereinafter referred to as application virtual machines capable of executing one or more applications.

In addition, in embodiments of the present invention, resources within each virtualization server act together to implement distributed network of data storage as a virtual storage pool. In particular, the distributed network of data storage is capable of implementing distributed data resource sharing between the virtualization servers 110A-N and their supported application virtual machines. Cooperation between the virtualization servers 110A-N is effected through the communication network 120 to implement the distributed network of data storage. As a result, application virtual machines supported by one or more virtualization servers are capable of accessing a virtual data storage pool for storage purposes.

In one embodiment, each virtualization server hosts and supports its own corresponding application virtual machines in a stand-alone environment. That is, the virtualization server may not be aware of or support other virtual environments that are supported by other virtualization servers.

In another embodiment, application virtual machines are supported by more than one virtualization server in a virtual environment that spans across multiple virtualization servers. For instance, a central controller may implement a virtual environment that pools resources from more than one virtualization server. As such, advanced features of enhanced server virtualization can be implemented, to include live and transparent migration of virtual machines, and dynamic balancing of computing resources across resource pools, and intelligent resource allocation based on predefined rules, among others. These advanced features are made possible, in part, by virtue of distributed resource sharing exhibited by the virtual data storage pool.

Figure 2:
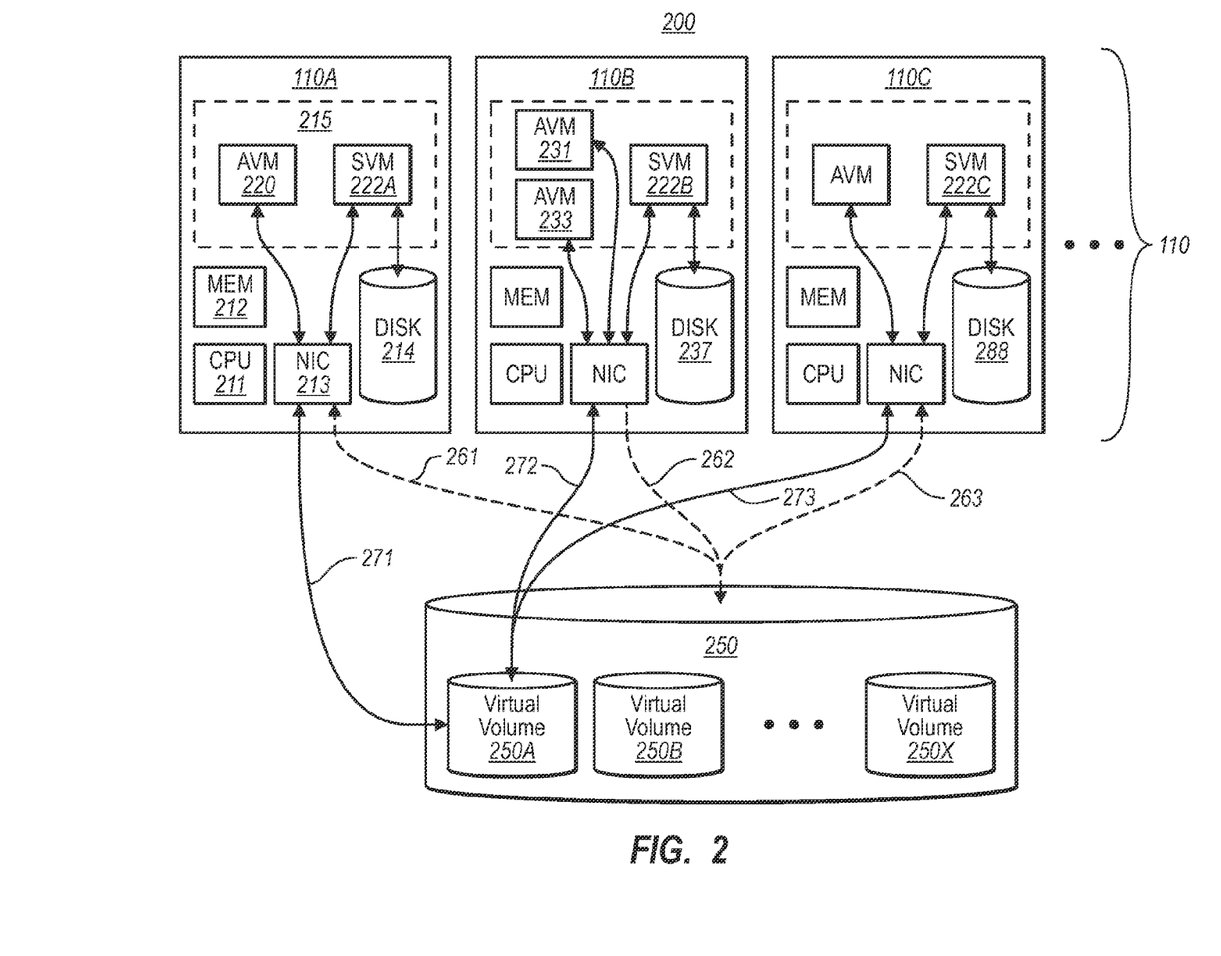
FIG. 2 is a diagram illustrating a system of distributed network storage in a virtual storage pool across a network of computing resources, in accordance with one embodiment of the present invention.

FIG. 2 is a diagram illustrating a distributed network of data storage in a virtual storage pool across a network of computing resources 200, in accordance with one embodiment of the present invention. The network 200 provides support for the plurality of virtualization servers 110A-N of FIG. 1, in one embodiment. For example, each of the virtualization servers 110A-N, as well as each of the supported application virtual machines in network 200, is capable of communicating with other virtualization servers 110A-N and supported application virtual machines throughout the network 200 using the communication network 120.

Each of the plurality of virtualization servers 110A-N comprises a physical server which is capable of providing an environment in which application virtual machines can run. For instance, the virtualization server can be a personal computer, notebook computer, server computer, mainframe, networked computer, handheld computer, personal digital assistant, workstation, and the like. Each virtualization server includes, in part, a CPU, memory, network interface, and data storage (e.g., disk) as hardware resources. More particularly, the underlying hardware includes data storage, such as non-volatile memory storage to support the applications running on corresponding application virtual machines.

For instance, as a representative example, the underlying hardware of the virtualization server 110A includes a central processing unit (CPU) 211 providing computing resources, memory 212, network interface (e.g., network interface card (NIC)) 213, additional data resources 214, etc. More specifically, the network interface 213 provides for communication with the communication network 120. Further, the data resources 214 includes at least one data storage device. For example, the data storage device is a disk drive. Other types of data storage are well suited to supporting the distributed network of data storage, to include tape drives, disk drives, combination of various storage devices, etc.

Embodiments of the present invention are implemented within one or more virtual environments supported by computing resources, or virtualization servers. That is, in the case of a single computing resource, such as virtualization server 110A, virtualization provides for the separation of the underlying hardware from the applications requesting those hardware resources.

As shown in FIG. 2, one or more application virtual machines can be implemented within a single, physical computing resource, such as one of the plurality of virtualization servers 110A-N. For instance, virtualization server 110A supports a single application virtual machine 220. Also, virtualization server 110B supports application virtual machines 231 and 233. For purposes of brevity and clarity, the virtualization features of the virtualization server 110A is described below as being representative of the virtualization features of each of the virtualization servers 110A-N.

The virtualization server 110A includes a virtual environment 215 that is supported through a virtualization layer (not shown), as supported by the underlying hardware resources. As described previously, the virtual environment 215 can support one or more application virtual machines. Specifically, each of the virtual machines in the virtual environment supported by virtualization server 110A runs its own virtual operating system, virtual memory, and virtual data resources, as implemented through a corresponding virtualization layer, for example. As a result, virtualization allows for better utilization of the underlying hardware resources by allowing for multiple virtual machines to run and share the hardware of a single computing resource. For instance, virtual memory can be greater than the memory in the underlying hardware of the computing resource.

In particular, the virtualization layer provides for one or more application virtual machines to utilize the underlying hardware of the virtualization server. As such, a corresponding and supported application virtual machine provides the features of a particular application. While virtualization server 110A of FIG. 2 shows the implementation of one application virtual machine 220, other embodiments of the present invention provide for the implementation of multiple application virtual machines on a single virtualization server (e.g., virtualization server 110B). Each participating virtualization server in the network of computing resources 200 is similarly configured, in one embodiment.

In addition, embodiments of the present invention illustrate the inclusion of a storage virtual machine running on a virtualization server. More particularly, each of the virtualization servers in the network of computing resources 200 participating in the virtual storage pool 250 includes a storage virtual machine. As a representative example, virtualization server 110 includes storage virtual machine 222A. The storage virtual machine 222A is its own virtual machine running an application to interface with data resources 214 available through the corresponding virtualization server 110A.

More particularly, the storage virtual machines (e.g., 222A-N) on each virtualization server 110A-N communicate with each other through a communication network (e.g., network 120) to implement a virtual storage pool 250 that enables distributed and shared storage accessible by each of the virtualization servers 110A-N and corresponding application virtual machine(s). In one embodiment, the virtual storage pool 250 is implemented through a software protocol. As shown in FIG. 2, the dotted lines (e.g., 261, 262, 263, etc.) from each of the network interfaces (e.g., NIC 213) of virtualization servers 110A-N is representative of the cooperation between each of the storage virtual machines 222A-N to create and enable the virtual storage pool 250.

In particular, the storage virtual machines as a group is capable of combining all of the available data resources presented by the virtualization servers 110A-N. Put another way, each of the storage virtual machines contribute to the shared function of providing the virtual storage pool 250. That is, each of the storage virtual machines 222A-N is capable of presenting available data resources located through the corresponding virtualization server for use in a virtual storage pool 250, in one embodiment. As a representative example, storage virtual machine 222A of virtualization server 110A presents the available data resource 214 for use in the virtual storage pool 250.

As such, the virtualization servers as a group, through corresponding storage virtual machines, combines available data resources in a cooperative and coherent manner to make the resultant virtual storage pool 250 available for use by any virtualization server 110A-N and its corresponding application virtual machine(s). In particular, a storage virtual machine is able to provide virtual storage services to a corresponding virtualization server and corresponding application virtual machine(s) supported by the virtualization server. For instance, storage virtual machine 222A provides virtual storage through the virtual storage pool 250 for the virtualization server 110A and it corresponding and supported application virtual machine 220. In one embodiment, the available data resources includes block storage services (e.g., virtual volumes) presented through the virtual storage pool 250.

Furthermore, the storage virtual machines in the network of computing resources 200 are capable of combining all of the available data resources into a virtual storage pool 250, without requiring the addition of network attached storage resources (e.g., external storage area network), in one embodiment. That is, the present embodiment provides a coherent storage pool that is created by aggregating storage resources contained in a virtualization server pool. As previously described, this is shown in FIG. 2 by the dotted lines (e.g., 261, 262, 263, etc.) connecting each storage virtual machine (e.g., 222A-N) to each other via the dotted lines to implement the virtual storage pool. As such, one embodiment provides for distributed and shared storage by clustering the virtual storage available within the virtualized environment.

More specifically, the virtual storage pool 250 is a mechanism for aggregating and organizing the block storage that is exported from each virtualization server in the plurality of virtualization servers 110A-N into a coherent virtual storage from which virtual volumes of storage are accessible by each of the virtualization servers and application virtual machines running on any participating virtualization server. In the present Application, coherency is meant to describe a virtual storage pool that is organized into discrete portions of available space for storing data (e.g., volumes) that are known and accessible by each of the virtualization servers 110A-N. More specifically, a virtual volume consists of blocks of data grouped together in a coherent fashion by the virtual storage pool 250.

In one embodiment, the virtual volumes 250A-X of virtual storage pool 250 are presented on the communication network 120 for access. The number of volumes do not necessarily correspond to the number of virtualization servers. For instance, the number of volumes may be greater than, less than, or equal to the number of virtualization servers 110A-N.

As shown in FIG. 2, the solid lines (e.g., 271, 272, and 273) show access to a particular virtual volume 250A by one or more virtualization servers 110A-C and corresponding application virtual machines through the communication network 120. In one embodiment, the virtual volumes (e.g., 250A-X) are given a network address for the virtualization servers and application virtual machines to access for storage. That is, the virtual storage pools are presented on the network as a separate pool of storage configured in virtual volumes. Each virtual volume may be imported back into a virtualization server or may be accessed by one or more application virtual machines.

Further, at the very least, each of the storage virtual machines is capable of mapping its own data storage resources to the virtual storage pool, such that requests for data from a particular virtual volume is understood by the corresponding one or more storage virtual machines that controls the storage devices supporting that virtual volume. In another embodiment, each of the storage virtual machines is capable of mapping all the data resources to the virtual storage pool. That is, each storage virtual machine understands the mapping of localized data storage devices to the virtual storage pool.

The virtual storage pool 250 allows for the ability to form virtualization server clusters within the virtual environment, in accordance with one embodiment of the present invention. This provides value added storage functionality in a transparent fashion, such as snapshot of data, cloning, backup, remote replication, extending the virtualized server pool across geographic distance, etc., in embodiments of the present invention. These features are transparent, as each of the virtualization servers 110A-N may be unaware of the movement of underlying data for application virtual machines from hardware resources of one virtualization server to hardware resources of another virtualization server.

As such, the virtual storage pool 250 allows for the realization of the benefits of advanced server virtualization in data centers and remote offices, without coming up against additional space or budget constraints that would be required when deploying additional network attached data storage resources, such as in a external storage area network (SAN). Advantageously, the virtual storage pool 250 of the present invention is more cost effective than a solution using an external SAN, since any additional cost of adding network attached data storage resources can be avoided.

An example of advanced server virtualization provides for the use of a virtual storage pool allows for live and transparent migration of application virtual machines from one virtualization server to another virtualization server, in one embodiment. Also, distributed resource sharing is enabled to provide for dynamic balancing of computing resources across resource pools, and intelligent resource allocation based on predefined rules, in another embodiment. Further, virtual storage pools ensure high availability of the resources to the virtualization servers, since virtual machines are automatically restarted, and there is low cost and high availability for all application virtual machines.

For instance, the virtual storage pool 250 provides for relocation of one application virtual machine supported by a first virtualization server to be migrated to a second virtualization server for purposes of survivability in case of failure of all or part of a virtualization server, or all or part of a virtual machine or storage virtual machine. As shown in FIG. 2, a single volume 250A in the shared virtual storage pool 250 supports one or more application virtual machines, as shown by the solid lines 271, 272, and 273. As such, a first virtualization server is able to migrate an application virtual machine to a second virtualization server, because they are sharing the same virtual volume or volumes. In particular, as a representative example, virtualization server 110A is able to migrate application virtual machine 220 to virtualization server 110C, because they share virtual volume 250A.

In addition, in one embodiment, a virtual volume may be captured or supported by the data resources within one virtualization server. For instance, virtual volume 250A may be supported by the data resources 214. In another embodiment, a virtual volume may be captured or supported by the data resources of multiple virtualization servers. For instance, virtual volume 250A is supported by data resources 214 of virtualization server 110A and data resources 237 of virtualization server 110B, as well as any other data resources of any other virtualization server. In this manner, redundancy of data can be accomplished, as will be shown below in relation to FIG. 5.

Figure 3:
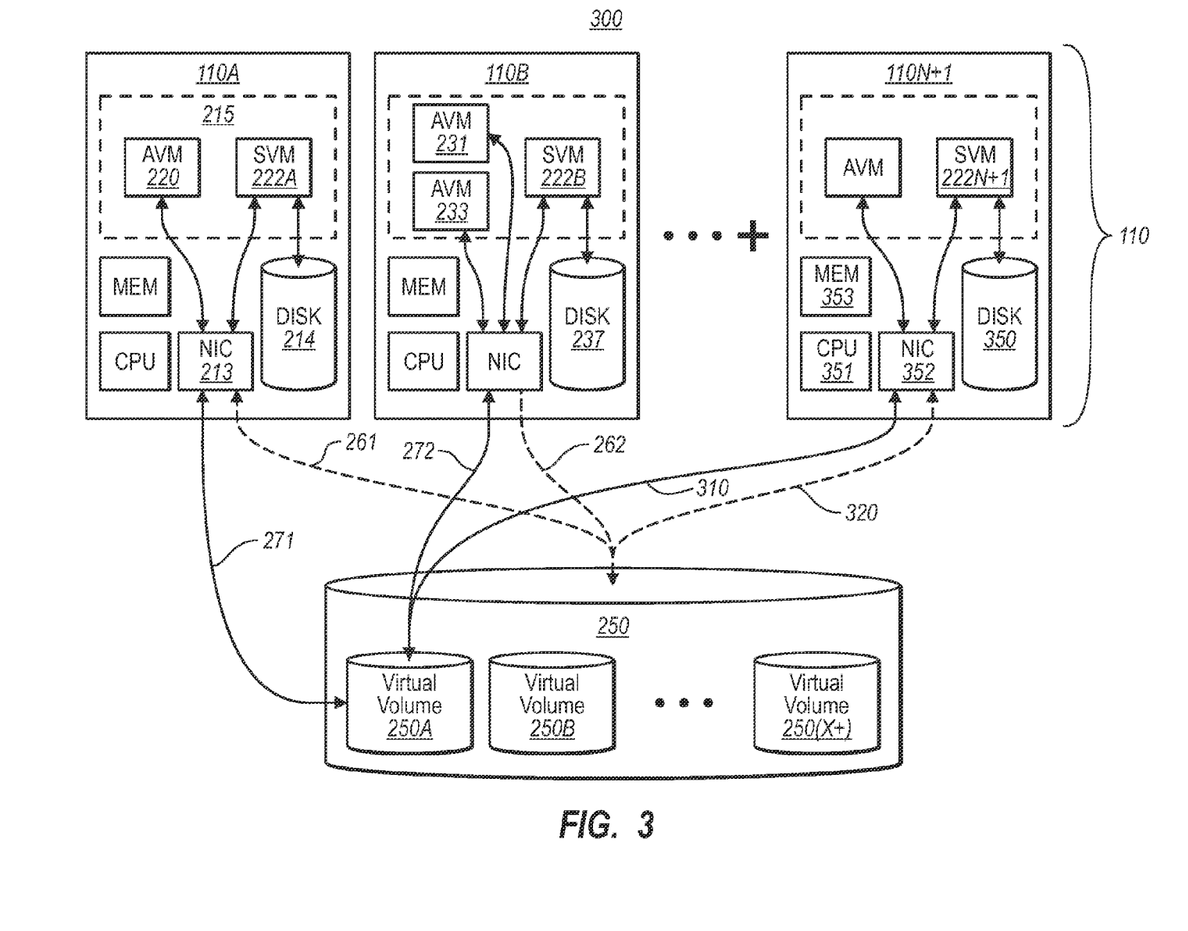
FIG. 3 is a diagram illustrating the scalability of a system of distributed network storage as implemented in a virtual storage pool across a network of computing resources, in accordance with one embodiment of the present invention.

Turning now to FIG. 3, a diagram is shown illustrating the scalability of a distributed network of data storage as implemented in a virtual storage pool 250 across a network of computing resources 300, in accordance with one embodiment of the present invention. The network of computing resources is based on the network 200, first introduced in FIG. 2, and includes additional virtualization servers that contribute to the scalability of the virtual storage pool 250. The additional virtualization servers are represented by virtualization server 110(N+1). It is important to note that one or more virtualization servers can be added to network 200 to form the network of computing resources 300 to provide a scalable distributed network of data storage in the form of the virtual storage pool 250.

In particular, each of the virtualization servers 110A-(N+1) comprises a physical server which is capable of providing an environment in which virtual machines can run. In particular, a corresponding virtualization layer allows for one or more application virtual machines to utilize the underlying hardware of a corresponding virtualization server. As such, each application virtual machine provides the features of one or more applications.

In addition, a storage virtual machine is associated with participating virtualization servers. The storage virtual machines 222A-(N+1) on each virtualization server of a network of computing resources 300 communicate with each other through a communication network 120 to implement a virtual storage pool 250 that enables shared storage that is accessible by each of the virtualization servers 110A-(N+1) and corresponding application virtual machines. Each participating virtualization server 110A-(N+1) in the network of computing resources 300 is similarly configured to provide the distributed network of data storage.

As shown in FIG. 3, the shared virtual storage pool 250 scales as a function of each additional virtualization server 110(N+1). As such, rather than requiring additional external network attached data resources, as the network of computing resources expands with the addition of virtualization servers, so does the virtual storage pool 250. As a result, the distributed and shared data storage provided by virtual storage pool 250 provides for capacity increase or multiplicity of virtual volumes in virtual storage pool 250 as well as data redundancy and high availability, in embodiments of the present invention.

For instance, FIG. 3 shows the addition of another virtualization server 110(N+1). While FIG. 3 shows the addition of one virtualization server, other embodiments are well suited to the expansion of the network of computing resources through the addition of one or more virtualization servers. The additional virtualization server 110(N+1) includes, in part, a CPU 351, memory 353, network interface 352, and data resources 350. As shown, the storage virtual machine 222(N+1) in the additional virtualization server 110(N+1) is able to communicate through the communication network 120 to other storage virtual machines 222A-N on the other virtualization servers 110A-N. That is, storage virtual machine 222(N+1) of virtualization sever 110(N+1) presents the available data resource 350 for use in the virtual storage pool 250. As such, the data storage resources 350 associated with the additional virtualization server 110(N+1) can be similarly added to the virtual storage pool 250, as shown by the dotted line 320. Expansion of the virtual storage pool is represented by the inclusion of virtual volume 250(X+). Expansion of the virtual storage pool 250 may be achieved through any number of means, such as increasing the size of each virtual volume 250A-X, adding one or more virtual volumes 250(X+), or reconfiguring the existing set of virtual volumes, in embodiments of the present invention. This illustrates the scalability of the virtual storage pool with the addition of each virtualization server 110(N+1).

This is in contrast to systems that provide virtual storage through network attached data storage, such as a storage area networks (SANs) or network attached storage (NAS). As the network of computing resources expands with the addition of more virtualization servers, the network attached storage does not similarly expand. Expansion of the network attached storage in the instance would require the addition of resources outside of the virtualization servers.

In one embodiment, the virtual volumes 250A-(X+) of virtual storage pool 250 are presented on the communication network 120 for access. For instance, as shown in FIG. 3, the solid lines (e.g., 271, 272, and now 310) show access to a particular virtual volume 250A by one or more virtualization servers 110A, 110B and 110(N+1) and corresponding application virtual machines through the communication network 120. In one embodiment, the virtual volumes 250A-(X+) are given a network address for the virtualization servers and application virtual machines to access for storage. That is, the virtual storage pools are presented on the network as a separate pool of storage configured in virtual volumes. Each virtual volume may be imported back into a virtualization server, in one embodiment, or may be accessed by one or more application virtual machines, in another embodiment, as previously described.

Figure 4:
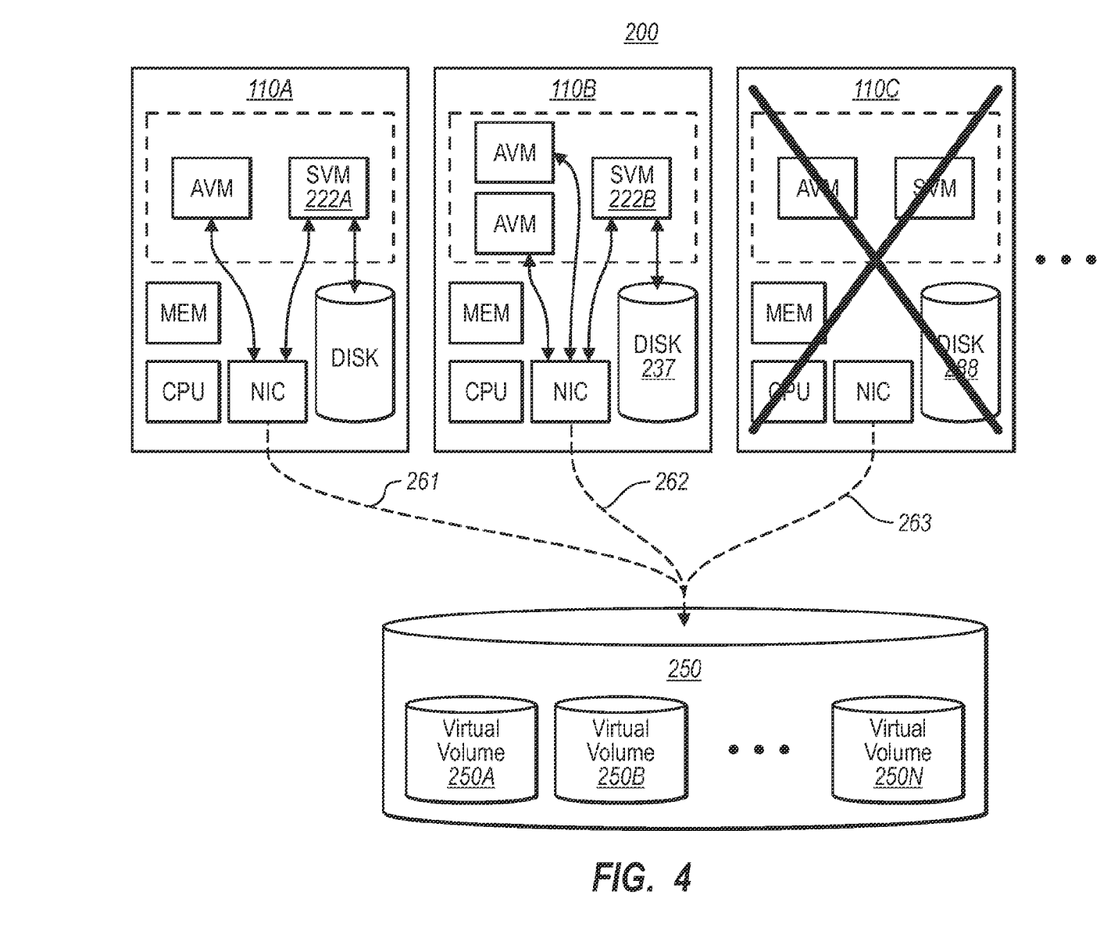
FIG. 4 is a diagram illustrating the redundant storage capabilities of a system of distributed network storage as implemented in a virtual storage pool across a network of computing resources, in accordance with one embodiment of the present invention.

FIG. 4 is a diagram illustrating the redundant storage capabilities of a system of distributed network storage, as implemented in a virtual storage pool 250 across a network of computing resources 200 first shown in FIG. 2, in accordance with one embodiment of the present invention. In particular, FIG. 4 provides for survivability of data in the virtual storage pool 250 in case of failure of all or part of one or more virtualization servers, to include the failure of one or more storage virtual machines 222A-N.

As shown in FIG. 4, the network of computing resources 200 includes a plurality of virtualization servers 110A-N, as previously described. Each virtualization server comprises a physical server which is capable of providing an environment in which virtual machines can run. As such, each application virtual machine provides the features of a particular application. In addition, a storage virtual machine is associated with participating virtualization servers. The storage virtual machines 222A-N on corresponding virtualization servers 110A-N communicate with each other through a communication network 120 to implement a virtual storage pool 250 that enables shared storage accessible by each of the virtual servers and corresponding application virtual machines. Each participating virtualization server in the network of computing resources is similarly configured.

As shown in FIG. 4, a representative virtualization server 110C has failed. As such, the hardware resources available on that virtualization server has also failed. However, the virtual storage pool 250 provides for data redundancy, as shown by a copy of virtual volumes 250A'-N' symbolically located behind its respective virtual volume 250A-N in FIG. 5. This redundancy may be implemented through any suitable means. As a result, the data located on the data storage resources 288 of the failed virtualization server 110C remains available and is readily accessed. That is, though the virtualization server 110C has failed, the data located on the hardware of the failed virtualization server has not been lost, and correspondingly, data has not been lost within the context of the virtual volumes 250A-N in the virtual storage pool 250. More specifically, embodiments of the present invention provide for redundancy and high availability of the data contained within the virtual volumes 250A-N.

In addition, the features of the virtual storage pool 250 in FIGS. 2-4 enables an application virtual machine supported by the failed virtualization server 110C to migrate to another virtualization server within the virtualized server pool. Again, this migration happens transparently, in one embodiment.

Figure 5:
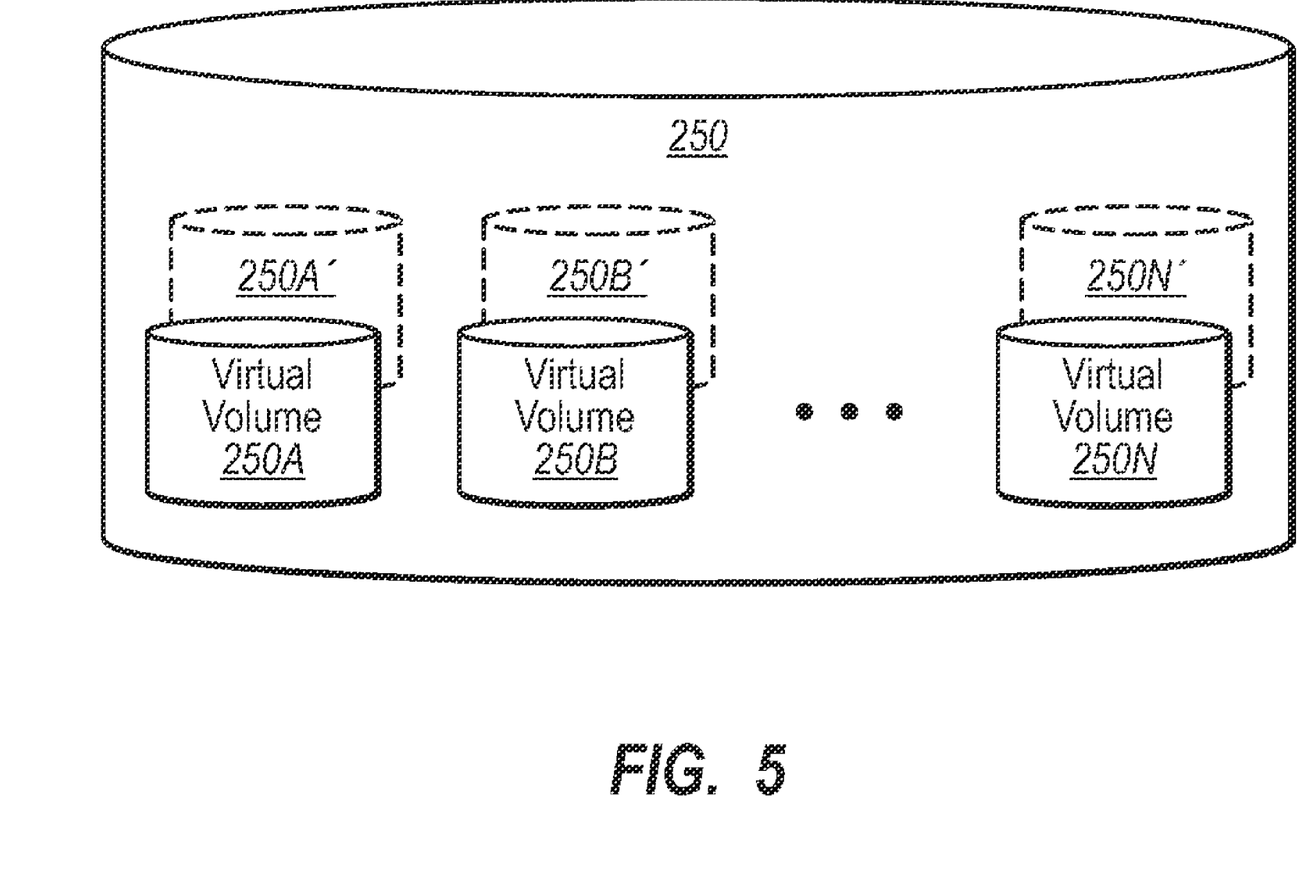
FIG. 5 is a diagram illustrating the redundant features of the virtual storage pool first introduced in FIG. 2, in accordance with one embodiment of the present invention.

Turning now to FIG. 5, a diagram is shown illustrating the redundant features of the virtual storage pool 250 of FIGS. 2-4, in accordance with one embodiment of the present invention. As shown, virtual storage pool 250 includes virtual volumes 250A-N. In addition, one or more of the virtual volumes 250A-N may be replicated within the virtual storage pool 250. That is, data from one virtual volume is replicated to another virtual volume of the virtual storage pool 250. For instance, each of the virtual volumes 250A-N is shown to be replicated by a corresponding and replicated virtual volume 250A'-N' for purposes of fault tolerance, as previously discussed in relation to FIG. 4. As a representative example, virtual volume 250A is replicated in virtual volume 250A'.

Figure 6:
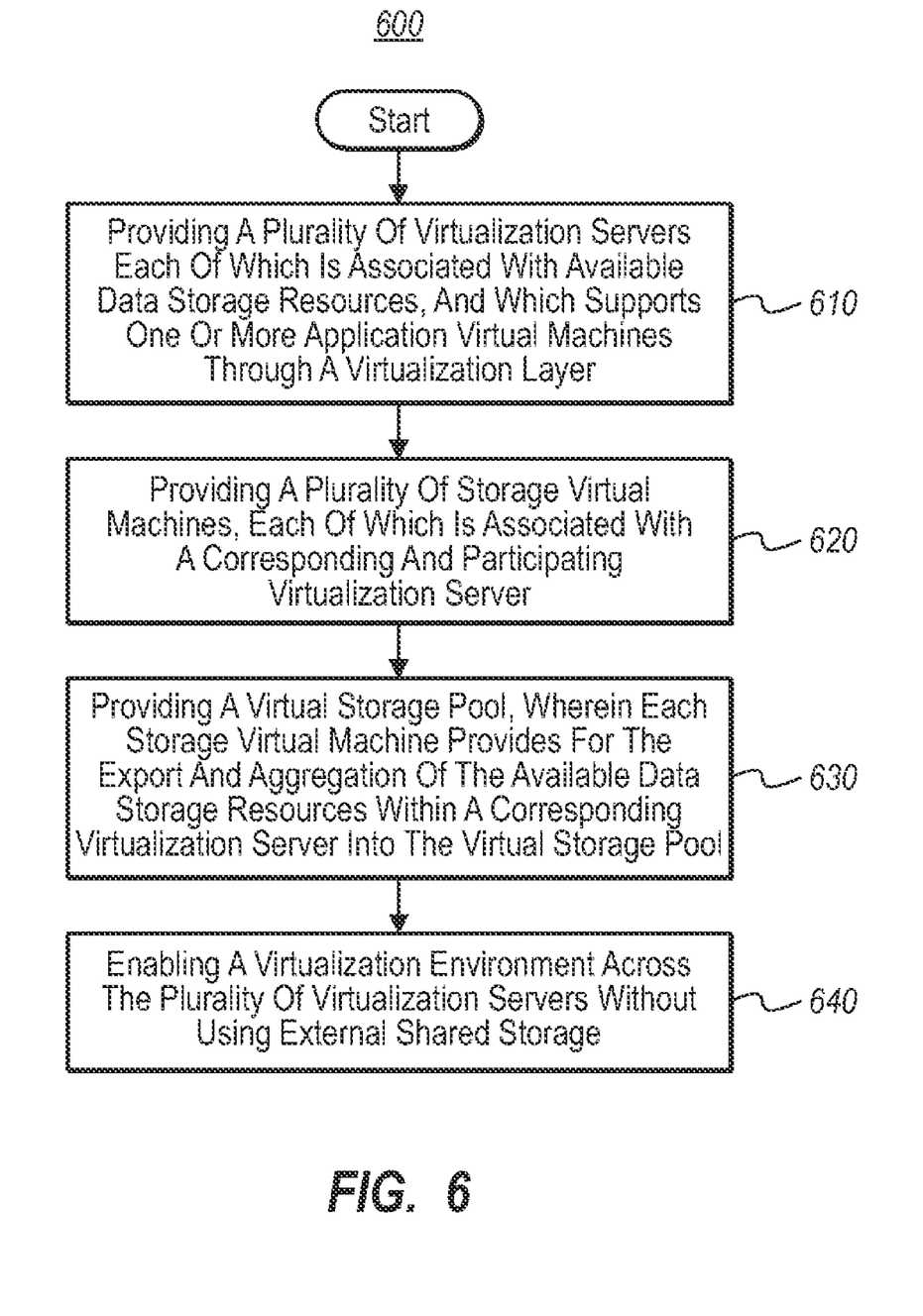
FIG. 6 is a flow diagram illustrating steps in a method for implementing distributed data storage across a network of computing resources, in accordance with one embodiment of the present invention.

FIG. 6 is a flow diagram 600 illustrating steps in a method for implementing distributed data storage, in accordance with one embodiment of the present invention. In particular, flow diagram is used to create and enable the features of the distributed network of data storage shown in FIGS. 2-5, in embodiments of the present invention.

At 610, a plurality of virtualization servers is provided in a network of computing resources. For instance, the plurality of virtualization servers is analogous to the network of computing resources 200 and 300 of FIGS. 2-4. Each of the virtualization servers is associated with available data storage resources for purposes of contributing to a virtual storage pool providing distributed data storage. In addition, each virtualization server supports one or more application virtual machines through a virtualization layer, as previously described.

At 620, a plurality of storage virtual machines is provided. In particular, each virtualization server participating for purposes of providing distributed data storage is associated with a corresponding storage virtual machine. For instance, virtualization server 110A of network 200 includes a storage virtual machine 222A. As described previously, each storage virtual machine allows and provides for the export and aggregation of corresponding available data storage resources within a corresponding virtualization servers into the virtual pool. As such, the storage virtual machines as a group is capable of combining all of the available data resources presented by the plurality of virtualization servers into a virtual storage pool that provides distributed data storage.

At 630, a virtual storage pools is provided. For instance, virtual storage pool 250 of the network of computing resources is provided in operation 630. In particular, the plurality of virtualization servers through corresponding storage virtual machines combines available data resources in a cooperative and coherent manner to make the resultant virtual storage pool available for use by any virtualization server and its corresponding application virtual machines.

At 640, a virtualization environment is enabled across the plurality of virtualization servers without using any external shared storage. In particular, the virtual storage pool is created and implemented without the use of any external shared storage. That is, only available data storage resources provided by the plurality of virtualization servers is used to implement the virtual storage pool. As such, shared access by one or more virtualization servers and also one or more application virtualization machines to one or more virtual volumes in the virtual storage pool is possible, as previously described.

Accordingly, embodiments of the present invention are capable of creating a virtual storage pool for implementing shared storage within a virtual environment that enables key server virtualization capabilities. In addition, other embodiments of the present invention provide the above capabilities and also provides for the ability for a node to fail without loss of access to shared storage. Still other embodiments of the present invention provide the above capabilities and also provides for the migration of virtual machines to an alternate node supporting the virtual network of computing resources. Furthermore, other embodiments of the present invention provide the above capabilities and further provide scalability of the virtual storage pool as a function of the addition of computing resources supporting the virtual network of computing resources, without requiring the addition of dedicated network attached storage devices.

While the methods of embodiments illustrated in flow chart 6 show specific sequences and quantity of operations, the present invention is suitable to alternative embodiments. For example, not all the operations provided for in the methods presented above are required for the present invention. Furthermore, additional operations can be added to the operations presented in the present embodiments. Likewise the sequences of operations can be modified depending upon the application.

A method and system for implementing a virtual storage pool for enabling shared storage within a virtual environment is thus described. While the invention has been illustrated and described by means of specific embodiments, it is to be understood that numerous changes and modifications may be made therein without departing from the spirit and scope of the invention as defined in the appended claims and equivalents thereof. Furthermore, while the present invention has been described in particular embodiments, it should be appreciated that the present invention should not be construed as limited by such embodiments, but rather construed according to the below claims.

We claim:

1. A system for implementing distributed data storage, comprising:
    a plurality of virtualization servers each of which is associated with data storage resources, and which supports one or more application virtual machines through a corresponding virtualization layer;
    a plurality of storage virtual machines, each of which is associated with a corresponding virtualization server; and
    a virtual storage pool, wherein each of said storage virtual machines is to provide for export and aggregation of said data storage resources associated with a corresponding virtualization server into said virtual storage pool, and wherein said storage virtual machines are to cooperate to implement said virtual storage pool, wherein the virtual storage pool is implemented without using external shared storage.

2. The system of claim 1, wherein a virtual volume is to be replicated across said virtual storage pool.

3. The system of claim 1, wherein said virtual storage pool comprises shared storage, wherein said shared storage enables features involving more than one virtualization server in said plurality of virtualization servers.

4. The system of claim 1, wherein a virtual volume in said virtual storage pool is available to said plurality of virtualization servers and their associated application virtual machines.

5. The system of claim 1, wherein a virtual volume in said virtual storage pool is available to one or more application virtual machines associated with one or more virtualization servers.

6. The system of claim 5, wherein said virtual volume is available to a first application virtual machine associated with a first virtualization server and a second application virtual machine associated with a second virtualization server.

7. The system of claim 5, wherein said virtual volume is available to a first application virtual machine associated with a first virtualization server and a second virtualization server.

8. The system of claim 1, wherein said virtual storage pool provides for data redundancy.

9. The system of claim 1, wherein said virtual storage pool is to scale as a function of the addition of virtualization servers and corresponding storage virtual machines.

10. The system of claim 1, wherein at least one virtualization server in said plurality of virtualization servers comprises:
    a data storage device as said available data storage resource.

11. The system of claim 1, wherein at least one of said one or more application virtual machines comprises:
    a virtual operating system for executing at least one application.

12. The system of claim 1, wherein said plurality of storage virtual machines are to provide distributed management of said virtual storage pool.

13. The system of claim 1, wherein said plurality of storage virtual machines are to provide said data storage resources associated with the corresponding virtualization servers for use by the applications virtual machines.

14. The system of claim 13, wherein each of said plurality of virtual machines are separate from the virtualization layer in the corresponding virtualization server.

15. A method for implementing distributed data storage, comprising:
    providing a plurality of virtualization servers each of which is associated with data storage resources, and which supports one or more application virtual machines through a virtualization layer;
    providing a plurality of storage virtual machines, each of which is associated with a corresponding virtualization server;
    providing a virtual storage pool, wherein each of said storage virtual machines is to provide export and aggregation of said data storage resources within the corresponding virtualization server into said virtual storage pool;
    cooperating, by the plurality of storage virtual machines, to implement said virtual storage pool; and enabling a virtualization environment across said plurality of virtualization servers without using external shared storage.

16. The method of claim 15, wherein said enabling the virtualization environment comprises:
transferring an application virtual machine from a first virtualization server to a second virtualization server without using said external shared storage.

17. The method of claim 15, wherein said enabling the virtualization environment comprises:
providing for dynamic load balancing of one or more application virtual machines across virtualization servers without using said external shared storage.

18. The method of claim 15, further comprising: providing, by said plurality of storage virtual machines, said data storage resources associated with the corresponding virtualization servers for use by the application virtual machines.

19. A virtualization server for implementing distributed data storage, comprising:
a processor for providing computing resources;
data storage resources;
a virtualization layer for implementing a virtual environment for utilizing said processor, wherein said virtual environment includes at least one application virtual machine executing an application; and
a first storage virtual machine to provide export and aggregation of said data storage resources into a virtual storage pool, wherein said virtual storage pool is to provide said distributed data storage from a plurality of virtualization servers, each of which includes a corresponding storage virtual machine providing the export and aggregation of corresponding data storage resources into said virtual storage pool, wherein the first storage virtual machine is to cooperate with storage virtual machines of other ones of the plurality of virtualization servers to implement said virtual storage pool, wherein the virtual storage pool is implemented without using external shared storage.

20. The virtualization server of claim 19, wherein the virtualization layer is separate from the first storage virtual machine.

* * * * *